Patented July 21, 1953

2,646,430

UNITED STATES PATENT OFFICE 2,646,430

QUINOLINE DYES OF THE POLYMETHINE SERIES AND PROCESS OF PREPARATION

Leslie G. S. Brooker and Donald W. Heseltine, Rochester, N. Y., assignors to Eastman Kodak Company, Rochester, N. Y., a corporation of New Jersey No Drawing. Application April 8, 1950, Serial No. 154,883

11 Claims. (Cl. 260—240.6)

This invention relates to new quinoline dyes of the polymethine series and processes for making them.

Polymethine dyes containing a simple quinoline nucleus have long been known. Representative of such dyes is 1,1'-diethyl-2,2'-carbocyanine iodide having the formula:

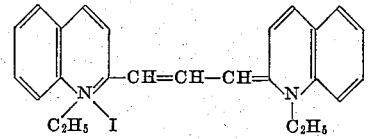

While such dyes contain a simple quinoline nucleus, we have now found certain polymethine dyes which contain a complex or fused quinoline nucleus.

It is, therefore, an object of our invention to provide new polymethine dyes containing a fused quinoline nucleus. Another object of our invention is to provide methods for making such dyes. Still another object is to provide photographic silver halide emulsions sensitized with our new dyes and processes for preparing these sensitized emulsions. Other objects will become apparent from a consideration of the following description and examples.

The new polymethine dyes of our invention contain a complex or fused quinoline nucleus having a bridge of atoms from the one to the eight positions of the quinoline nucleus, as illustrated in the following general formula:

I.

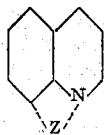

wherein Z represents the nonmetallic atoms necessary to complete a pyrrole, pyridine, or thiazine ring.

Representative polymethine dyes of our invention containing a complex or fused quinoline nucleus comprise those represented by the following general formulas:

II.

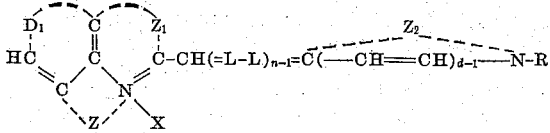

III.

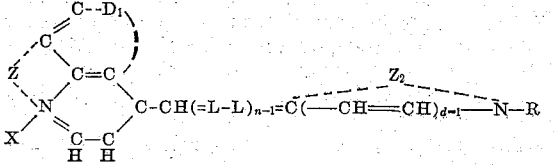

IV.

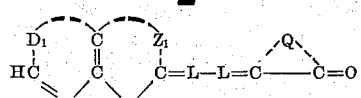

V.

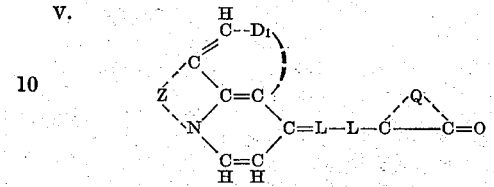

VI.

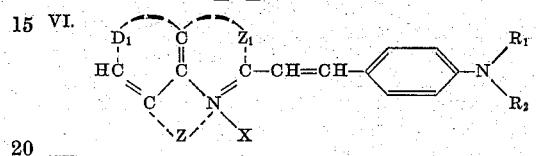

VII.

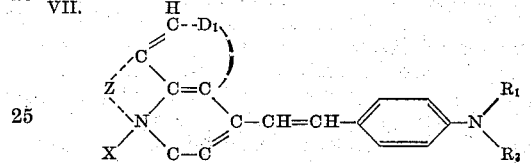

VIII.

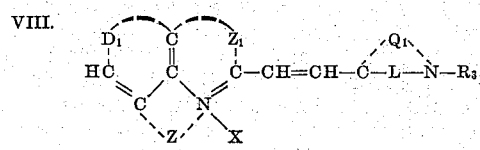

IX.

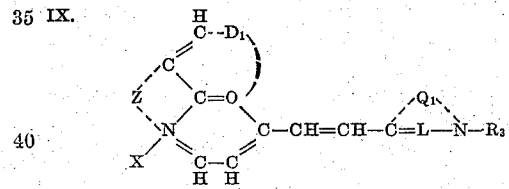

X.

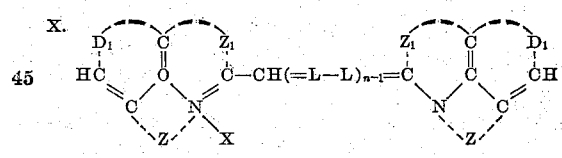

and

XI.

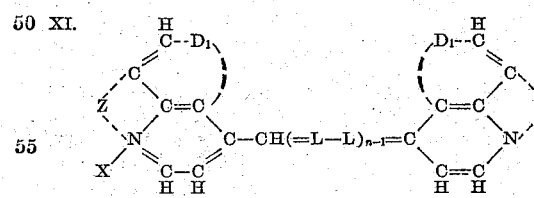

wherein R and $R_3$ each represents an alkyl group (substituted or unsubstituted), e. g., methyl, ethyl, n-butyl, isobutyl, allyl (vinyl-methyl), β- ethoxyethyl, β-hydroxyethyl, β-acetoxyethyl, carbethoxymethyl, benzyl (phenylmethyl), β-phenylethyl, etc. (e. g. an alkyl group, especially a primary alkyl group, containing from 1 to 8 carbon atoms), or an aryl group, e. g., a monocyclic aryl group of the benzene series, such as phenyl, p-chlorophenyl, etc., $R_1$ and $R_2$ each represents an alkyl group such as methyl, ethyl, etc., L represents a methine group (substituted or unsubstituted), $D_1$ represents the nonmetallic atoms necessary to complete a mononuclear aryl group of the benzene series, Q represents the nonmetallic atoms necessary to complete a heterocyclic nucleus containing 5 atoms in the ring, e. g., a rhodanine nucleus, a 2-thio-2,4(3,5)-oxazoledione nucleus, a pyrazolone nucleus, a 2-thiohydantoin nucleus, etc., Q represents the nonmetallic atoms necessary to complete a heterocyclic nucleus of the pyrrole series, n and d each represents a positive integer from 1 to 2, X represents an acid radical, e. g., chloride, bromide, iodide, thiocyanate, sulfamate, methylsulfate ($CH_3O{-}SO_3^-$), ethylsulfate ($C_2H_5O{-}SO_3^-$), perchlorate, benzenesulfonate, p-toluenesulfonate, xylenesulfonate, acetate, etc., Z represents the nonmetallic atoms necessary to complete a heterocyclic nucleus of the pyrrole series, the pyridine series, or the thiazine series, $Z_1$ represents the nonmetallic atoms necessary to complete a heterocyclic nucleus containing from 5 to 6 atoms in the ring, such as, for example, heterocyclic nuclei selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thionaphtheno-7',6',4,5-thiazole series (e. g. 4'-methoxythionaphtheno-7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphtho selenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5 - trimethylindolenine, 3,3,7-trimethylindolenine, etc.), the pyridine series (e. g. pyridine, 5-methylpyridine, etc.), etc.

In accordance with our invention, we prepare the dyes represented by Formula II above wherein n represents 1 by condensing a cyclammonium quaternary salt containing a methyl group in the α- or γ-position (e. g. 2-methylbenzoxazole ethiodide) with a quaternary salt selected from those represented by the following general formula:

XII.

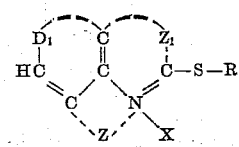

wherein R, X, $D_1$ and $Z_1$ have the values given above. The condensations are advantageously carried out in the presence of a basic condensing agent (i. e. an acid-binding agent) e. g. a tertiary amine, or a N-alkylpiperidine. Alkali metal carbonates or alkali metal alcoholates can also be employed. A reaction medium can also be employed, e. g. a lower molecular weight alcohol, e. g. ethyl, n-propyl, isopropyl, n-butyl, or isobutyl alcohol. Heat accelerates the condensations.

The carbocyanine dyes represented by Formula II (n equals 2) can advantageously be prepared by reacting a cyclammonium quaternary salt containing in the α- or γ-position a β-arylaminovinyl (e. g. β-acetanilido-vinyl) group or a β-alkylmercapto- or β-arylmercaptovinyl group (e. g. β-methylmercaptovinyl, β-methylmercaptobutenyl, etc.) with a cyclammonium quaternary salt selected from those represented by the following general formula:

XIII.

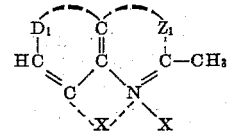

wherein Z, $Z_1$, D, and X have the values given above. As in the case of the condensations described above, acid-binding agents, such as the trialkylamines, etc. can be employed in the instant condensations. These condensations can also be carried out in the presence of lower molecular weight aliphatic alcohols, such as ethyl, n-propyl, etc. alcohols. Heat accelerates the condensations.

The monomethine dyes represented by Formula III (n equals 1) can be prepared by condensing a cyclammonium quaternary salt containing in the α- or γ-position a thioether group (e. g. an alkylthio, an aralkylthio, or arylthio group) or a halogen atom, e. g. a chlorine, bromine, or iodine atom, with a cyclammonium quaternary salt selected from those represented by the following general formula:

XIV. 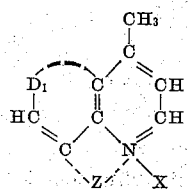

wherein Z, D₁ and X have the values set forth above. The condensations are advantageously carried out in the presence of a basic condensing agent, e. g. a tertiary amine, such as trimethylamine, triethylamine, dimethylaniline or a N-alkyl-piperidine. A reaction medium is advantageously employed, e. g. pyridine, or a lower molecular weight alcohol, such as ethyl, n-propyl, isopropyl, n-butyl, isobutyl, etc. An alkali metal carboxylate in a carboxylic anhydride can also be employed as basic condensing agent, e. g. sodium acetate in acetic anhydride. Heat accelerates the condensations.

The carbocyanine dyes coming within the scope of Formula III ($n$ equals 1) can advantageously be prepared by condensing one of the cyclammonium quaternary salts represented by Formula XIV above with a cyclammonium quaternary salt containing in the α- or γ-position a β-arylaminovinyl (e. g. β-acetanilidovinyl) group or β-alkylmercapto- or β-arylmercaptovinyl group (e. g. β-methylmercaptovinyl or β-methylmercaptobutenyl). The condensations are advantageously effected in the presence of an acid-binding agent, such as any of those mentioned above (e. g. trialkylamines), and an inert diluent, such as pyridine or an aliphatic lower molecular weight alcohol, e. g. ethyl, n-propyl, isopropyl, n-butyl, etc. alcohols. Heat accelerates the condensations.

The merocarbocyanine dyes represented by Formula IX above can advantageously be prepared by condensing a cyclammonium quaternary salt selected from those represented by Formula XIII above with a heterocyclic compound containing 5 atoms in the ring selected from those represented by the following general formula:

XV. 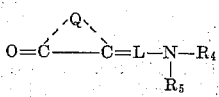

wherein Q and L have the values given above, R₄ represents a member selected from the group consisting of a hydrogen atom and an acyl group of a carboxylic acid, such as acetyl, propionyl, benzoyl, etc., groups, and R₅ represents an aryl group, such as a phenyl, diphenyl, xylyl, naphthyl (α- or β-), etc., group (e. g., an aryl group containing from 6 to 12 nuclear carbon atoms). Compounds coming within the scope of Formula XV have previously been described by Dains et al. See, for example, "Journal of the American Chemical Society," vol. 31 (1909), p. 1148; vol. 35 (1913), p. 959; vol. 38 (1916), p. 1841; vol. 40 (1918), p. 562; vol. 44 (1922), p. 2310; and Berichte, vol. 35 (1902), p. 2496. The condensations are advantageously effected in the presence of an acid-binding agent selected from those mentioned above, such as the trialkylamines (e. g., triethylamine) etc., and an inert diluent, such as 1,4-dioxane, acetic anhydride, a lower molecular weight alcohol, e. g. ethyl, n-propyl, etc., alcohols, etc. Heat accelerates the condensations.

The merocyanine dyes represented by Formula V above can advantageously be prepared by condensing a cyclammonium quaternary salt selected from those represented by Formula XIV above with a compound selected from those represented by Formula XV above. The condensations are advantageously effected in the presence of an acid-binding agent selected from those mentioned above; e. g., the trialkylamines (e. g., triethylamine), and an inert diluent, such as 1,4-dioxane, acetic anhydride, a lower molecular weight alcohol, e. g., ethyl n-propyl, etc., alcohols, etc. Heat accelerates the condensations.

The styryl dyes represented by Formula VI above can advantageously be prepared by condensing a cyclammonium quaternary salt selected from those represented by Formula XIII above with an aldehyde selected from those represented by the following general formula:

XVI. 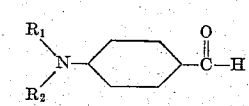

wherein R₁ and R₂ have the values given above. The condensations are advantageously effected in the presence of strong acid-binding agents, such as piperidine, ethylamine, diethylamine, diethylcyclohexylamine, α-picoline, etc., and an inert diluent, such as lower molecular weight alcohols, such as ethyl, n-propyl, isopropyl, n-butyl, isobutyl, etc. alcohols, aromatic hydrocarbons, e. g., benzene, toluene, etc., aliphatic ethers, etc. Heat accelerates the condensations.

The styryl dyes represented by Formula VII can advantageously be prepared by condensing a cyclammonium quaternary salt selected from those represented by Formula XIV above with an aldehyde selected from those represented by Formula XVI above. The condensations can advantageously be effected in the presence of a strong acid-binding agent, such as piperidine, ethylamine, diethylamine, etc., and an inert diluent, such as the lower molecular weight alcohols, e. g., ethyl, n-propyl, isopropyl, n-butyl, isobutyl, etc. alcohols, aromatic hydrocarbons, e. g., benzene, toluene, etc., aliphatic ethers. Heat accelerates the condensations.

The pyrrolocarbocyanine dyes represented by Formula VIII above can advantageously be prepared by condsensing a cyclammonium quaternary salt selected from those represented by Formula XIII above with an aldehyde selected from those represented by the following general formula:

XVII. 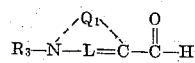

wherein R₃, Q₁ and L have the values given above. Typical aldehydes coming within the scope of those represented by Formula XVII comprise those represented by the following general formula:

XVIII. 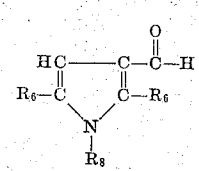

wherein R₆ represents an alkyl group (e. g., a methyl or ethyl group, etc.) and R₈ represents an alkyl group (e. g., a methyl or ethyl group, etc.)

or an aryl group (e. g., phenyl, p-chlorophenyl, etc. groups). The condensations can advantageously be effected in the presence of inert diluents, such as acetic anhydride, 1,4-dioxane, etc. Heat accelerates the condensations.

The pyrrolocarbocyanine dyes represented by Formula IX above can advantageously be prepared by condensing a cyclammonium quaternary salt selected from those represented by Formula XIV above with one of the aldehydes selected from those represented by Formulas XVII and XVIII above. The condensations can advantageously be effected in the presence of an inert diluent, such as acetic anhydride, 1,4-dioxane, aliphatic ethers, etc.

The cyanine dyes represented by Formula X above (n equals 1) can be prepared by condensing a cyclammonium quaternary salt selected from those represented by Formula XII above with malonic acid in the presence of an acid-binding agent, such as the trialkylamines (e. g., triethylamine), N-alkylpiperidines, dialkylanilines (e. g., dimethylanilines, etc.), etc., and an inert diluent, such as pyridine, 1,4-dioxane, a lower molecular weight alcohol, such as ethyl, n-propyl, etc. alcohols, etc. Heat accelerates the condensations.

The carbocyanine dyes represented by Formula X above (n equals 2) can advantageously be prepared by condensing a cyclammonium quaternary salt selected from those represented by Formula XIII above with an ortho ester of a carboxylic acid, such as ethyl orthoformate, or a dialkoxymethyl carboxylate, such as diethoxymethyl acetate, diethoxymethyl propionate, etc. The condensations are advantageously carried out in the presence of an inert diluent, such as pyridine, 1,4-dioxane, etc. Heat accelerates the condensations.

Another method for preparing the carbocyanine dyes represented by Formula X above (n equals 2) comprises heating together a cyclammonium quaternary salt selected from those represented by Formula XIII above and iodoform in the presence of an alcoholic solution of an alkali metal hydroxide, e. g., potassium hydroxide, etc. The condensations are advantageously effected in the presence of a diluent which may be the alcohol used in the alkali metal hydroxide solution, or another diluent, such as benzene, etc.

The carbocyanine dyes represented by Formula XI above (n equals 2) can advantageously be prepared by condensing a cyclammonium quaternary salt selected from those represented by Formula XIV above with an ortho carboxylic ester, e. g., ethyl orthoformate, or a dialkoxymethyl carboxylate, such as, for example, diethoxymethyl carboxylate. The condensations are advantageously effected in the presence of an inert diluent, such as pyridine, 1,4-dioxane, aliphatic ethers, etc.

Another method for making the carbocyanine dyes of Formula XI (n equals 2) comprises condensing a cyclammonium quaternary salt selected from those represented by Formula XIV above with iodoform in the presence of an alcoholic solution of an alkali metal hydroxide, such as potassium hydroxide, etc. The alcohols, whose alkali metal hydroxide solutions can be employed, include the lower molecular weight alcohols, such as ethyl, n-propyl, isopropyl, n-butyl, isobutyl, etc. alcohols. Advantageously, these alcohols are employed in substantially anhydrous form.

The following examples illustrate more fully the manner whereby we practice our invention.

*Example 1.—1,8,1',8' - diethylene - 2,2' - cyanine iodide*

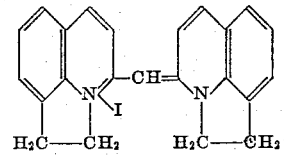

1,8-ethylene-2-thioquinolone (1.87 g.) and methyl p-toluene sulfonate (2.1 g.) were mixed and heated on the oil bath at 100° C. for one-half hour. Malonic acid (1.04 g.), pyridine (20 cc.) and triethylamine (0.51 g.) were then added and the reaction mixture heated under reflux for forty-five minutes. The reaction mixture was then poured into a solution of sodium iodide (3 g.) in 100 cc. of water. After two recrystallizations from methyl alcohol, the yield was 13 per cent of brownish needles, M. P.>350° C.

*Example 2.—3 - ethyl - 1',8'-ethylenethia-2'-cyanine iodide*

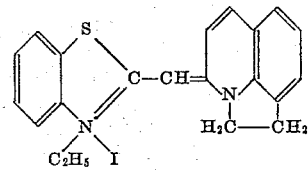

1,8-ethylene-2-thioquinolone (0.47 g.) and methyl p-toluenesulfonate (0.52 g.) were mixed and heated on the oil bath at 100° C. for one-half hour. 2-methyl benzothiazole ethiodide (0.77 g.), ethyl alcohol (20 cc.) and triethylamine (0.26 g.) were added and the reaction mixture refluxed for fifteen minutes. After chilling and filtering the yield of dye was 52%. Two recrystallizations from ethyl alcohol gave 0.40 g. (35 per cent) of orange needles, M. P. 322°–324° C. dec.

*Example 3.—3 - ethyl - 1',8'-ethyleneoxa-2'-carbocyanine iodide*

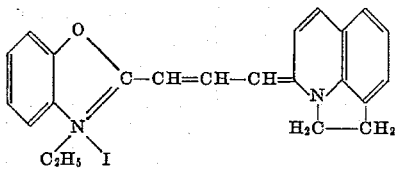

1,8-ethylene quinaldinium iodide (1.49 g.), β-acetanilidovinylbenzoxazole ethiodide (2.17 g.), ethyl alcohol (30 cc.) and triethylamine (0.51 g.) were mixed and heated under reflux for fifteen minutes. The dye separated on cooling in a 65 per cent yield. Two recrystallizations from methyl alcohol yielded 0.85 g. (37 per cent) of dark green crystals, M. P. 292°–293° C. dec.

*Example 4.—9 - ethyl - 1',8' - ethylene-3-methylthia-2'-carbocyanine iodide*

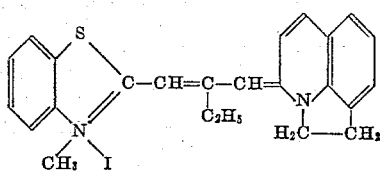

1,8-ethylene quinaldinium iodide (1.00 g.) and 2-(2-methylmercaptobutenyl) benzothiazole methiodide (1.26 g.) were suspended in ethyl alcohol (25 cc.) and triethylamine (0.34 g.) was added. The reaction mixture was heated under reflux for fifteen minutes, chilled and filtered yielding 0.90 g. (55 per cent) of crude dye. Two recrystallizations from methyl alcohol yielded 0.75 g. (45 per cent) of purplish crystals with a metallic red reflux, M. P. 272°–273° C. dec.

*Example 5.—1 - ethyl-1',8'-trimethylene-2,2'-cyanine iodide*

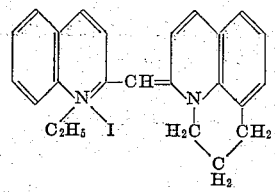

2 - methylmercapto-1,8-trimethylenequinolinium p-toluene sulfonate (1.93 g.) and quinaldine etho-p-toluene sulfonate (1.72 g.) were dissolved in ethyl alcohol (35 cc.) and triethylamine (0.51 g.) was added. The reaction mixture was heated under reflux for fifteen minutes and then poured into a solution of sodium iodide (3 g.) in 100 cc. of water. The crude dye (89 per cent) was filtered off and twice recrystallized from methyl alcohol yielding 1.35 g. (62 per cent) of red needles with blue reflex, M. P. 280°–281° C. dec.

*Example 6.—1,8,1',8'-ditrimethylene-2,2'-carbocyanine iodide*

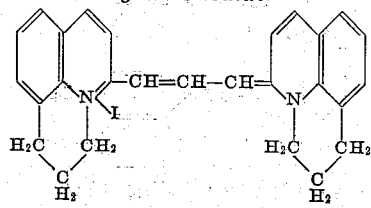

2 - methyl - 1,8 - trimethylenequinolinium iodide (3.11 g.) and diethoxymethyl acetate (2.45 g.) were dissolved in pyridine (30 cc.) and heated under reflux for one-half hour. The crude dye (85 per cent) was filtered off and twice recrystallized from pyridine yielding 1.2 g. (48 per cent) of minute greenish crystals, M. P. >350° C.

*Example 7.—3-ethyl-5-[(1,8-trimethylene-2(1)-quinolylidene) ethylidene] rhodanine*

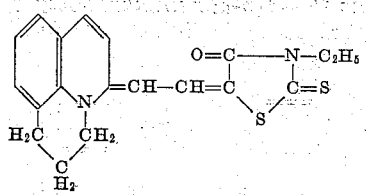

1,8-trimethylenequinaldinium iodide (1.55 g.) and 5-acetanilidomethylene-3-ethyl-rhodanine (1.53 g.) were dissolved in acetic anhydride and triethylamine (0.51 g.) was added. The reaction mixture was heated under reflux for one-half hour and chilled and filtered. The crude dye, 0.55 g. (31 per cent), was twice recrystallized from pyridine and methyl alcohol yielding 0.37 g. (21 per cent) of purplish crystals, M. P. 260°–261° C. dec.

*Example 8.—2 - p - dimethylaminostyryl-1,8-trimethylenequinolinium iodide*

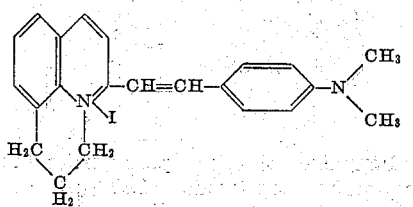

1,8-trimethylenequinaldinium iodide (1.55 g.) and p-dimethylaminobenzaldehyde (0.75 g.) were dissolved in ethyl alcohol (30 cc.) and five drops of piperidine were added. The reaction mixture was heated under reflux for two hours, then chilled and filtered, yielding 1.90 g. (86 per cent) of crude dye. Two recrystallizations from methyl alcohol gave 1.21 g. (56 per cent) of red plates, M. P. 305°–306° C. dec.

*Example 9.—3 - ethyl - 1',8'-trimethyleneoxa-4'-carbocyanine iodide*

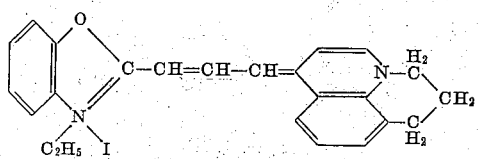

1,8-trimethylenelepidinium iodide (1.55 g.) and 2-β-acetanilidovinylbenzoxazole ethiodide (2.15 g.) were dissolved in 25 cc. of absolute ethyl alcohol and triethylamine (0.51 g.) was added. The reaction mixture was heated under reflux for fifteen minutes, chilled overnight, filtered, and dried yielding 2.05 g. (85 per cent). Two recrystallizations from methyl alcohol yielded 1.10 g. (46 per cent) of pure dye, M. P. 241°–242° C. dec.

*Example 10.—3-ethyl-1',8'-trimethylenethia-4'-carbocyanine iodide*

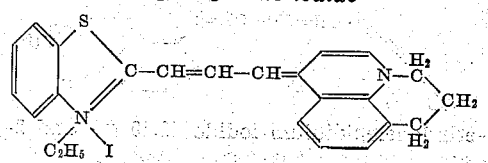

1,8-trimethylenelepidinium iodide (1.55 g.) and 2-β-acetanilidovinylbenzothiazole ethiodide (2.3 g.) were dissolved in 30 cc. of absolute ethyl alcohol and triethylamine (0.51 g.) was added. The reaction mixture was heated under reflux for fifteen minutes and then chilled overnight. The crude dye was filtered off and dried, yielding 2.25 g. (91 per cent). After two recrystallizations from methyl alcohol, the yield was 1.55 g. (65 per cent) of blue needles, M. P. 252°–253° C. dec.

*Example 11.—4 - p - dimethylaminostyryl-1,8-trimethylenequinolinium iodide*

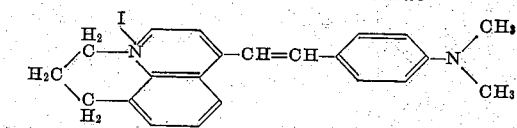

1,8-trimethylenelepidinium iodide (3.11 g.) and p-dimethylaminobenzaldehyde (1.49 g.) were dissolved in 50 cc. of absolute ethyl alcohol. Two drops of piperidine were added and the reaction mixture was heated under reflux for six hours. The reaction mixture was chilled overnight, filtered and recrystallized from methyl alcohol yielding 1.65 g. (38 per cent) of dye, M. P. 280°–281° C. dec.

*Example 12.—1,8,1',8'-ditrimethylene-4,4'-carbocyanine iodide*

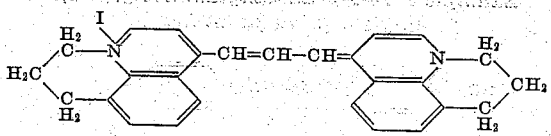

1,8-trimethylenelepidinium iodide (3.11 g.) and iodoform (2.0 g.) were dissolved in 20 cc. of absolute ethyl alcohol. Potassium hydroxide (1.3 g.) was dissolved in 30 cc. of hot ethyl alcohol and added to the solution of quaternary salt and iodoform. The reaction mixture was heated under reflux with shaking for three minutes, then chilled overnight, and filtered. The crude dye (2.18 g., 85 per cent) was recrystallized three times from methyl alcohol, yielding 1.05 g. (42 per cent), M. P. 266°–267° C. dec.

*Example 13.—1 - ethyl - 1',8' - trimethylene-2,4'-cyanine iodide*

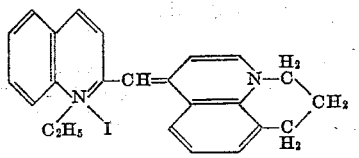

1,8-trimethylenelepidinium iodide (1.55 g.) and 2-iodoquinoline ethiodide (2.06 g.) were dissolved in 30 cc. of absolute ethyl alcohol and triethylamine (0.51 g.) was added. The reaction mixture was heated under reflux for sixty minutes, then chilled overnight, filtered and dried yielding 2.0 g. (85 per cent) of dye. The yield after two recrystallizations from methyl alcohol was 1.05 g. (46 per cent), M. P. 245°–247° C. dec.

*Example 14.—3 - ethyl-1',8'-ethyleneoxa-4'-carbocyanine iodide*

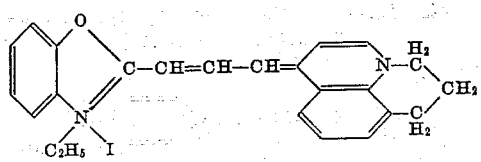

1,8-ethylenelepidinium iodide (1.49 g.) and 2-β-acetanilidovinylbenzoxazole ethiodide (2.2 g.) were dissolved in 30 cc. of absolute ethyl alcohol and triethylamine (0.51 g.) was added. The reaction mixture was heated under reflux for fifteen minutes, then chilled overnight, filtered, washed with water and acetone, and dried. The yield was 1.65 g. (71 per cent). After two recrystallizations from methyl alcohol, the yield was 1.05 g. (45 per cent), M. P. 261°–262° C. dec.

*Example 15.—3-ethyl-1',8'-ethylenethia-4'-carbocyanine iodide*

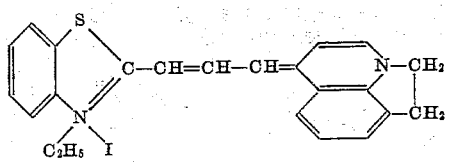

1,8-ethylenelepidinium iodide (1.49 g.) and 2-β-acetanilidovinylbenzothiazole ethiodide were dissolved in 30 cc. of absolute ethyl alcohol. Triethylamine (0.51 g.) was added and the reaction mixture heated under reflux for fifteen minutes and then chilled overnight. The crude dye was filtered, washed well with water and acetone, and dried. The crude dye (2.05 g., 85 per cent) was twice recrystallized from methyl alcohol, yielding 1.15 g. (48 per cent) of pure dye; M. P. 252°–253° C. dec.

*Example 16.—4-p-dimethylaminostyryl-1,8-ethylenequinolinium iodide*

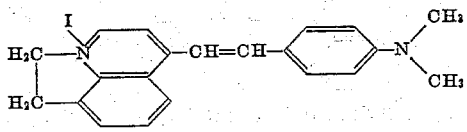

1,8-ethylenelepidinium iodide (2.97 g.) and p-dimethylaminobenzaldehyde (1.49 g.) were heated under reflux for four hours in 100 cc. of absolute ethyl alcohol with two drops of piperidine. The crude dye (1.55 g.; 72 per cent) was filtered from the chilled solution, washed with water and ether, and dried. Two recrystallizations from methyl alcohol yielded 0.75 g. (35 per cent) of dye, M. P. 256°–257° C. dec.

*Example 17.—1,8,1',8'-diethylene-4,4'-carbocyanine iodide*

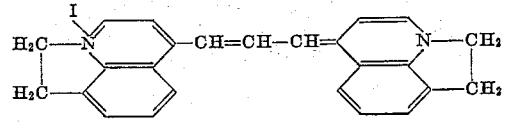

1,8-ethylenelepidinium iodide (2.97 g.) and iodoform (1.97 g.) were dissolved in 30 cc. of hot ethyl alcohol and added to a solution of potassium hydroxide (1.12 g.) in 70 cc. of ethyl alcohol. The reaction mixture was heated under reflux with stirring for five minutes, then chilled, filtered and washed with water, acetone and alcohol. The crude dye (1.40 g.; 59 per cent) was twice recrystallized from cresol and methyl alcohol yielding 0.55 g. (24 per cent) of dye, M. P. 275°–277° C. dec.

*Example 18.—1-ethyl-1',8'-ethylene-2,4'-cyanine iodide*

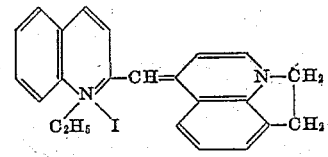

1,8-ethylenelepidinium iodide (1.49 g.) and 2-iodoquinoline ethiodide (2.05 g.) were dissolved in 35 cc. of absolute ethyl alcohol and heated under reflux for thirty minutes in the presence of triethylamine (0.51 g.) The reaction mixture was chilled overnight and the crude dye (1.95 g.; 85 per cent) filtered off, washed with water and dried. After two recrystallizations from methyl alcohol the yield was 0.90 (40 per cent) of dye, M. P. 251°–252° C. dec.

*Example 19.—4-p-dimethylaminostyryl-1,8-o-phenylenequinolinium perchlorate*

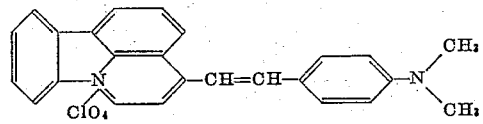

1,8-o-phenylenelepidinum perchlorate (1.06 g.) and p-dimethylaminobenzaldehyde (0.50 g.) were dissolved in 50 cc. of absolute ethyl alcohol and two drops of piperidine were added, and the reaction mixture was refluxed for two hours. The reaction mixture was chilled overnight, filtered, and the crude dye (0.75 g., 51 per cent) was washed with water and acetone, and dried. Two recrystallizations from methyl alcohol yielded 0.51 g. (34 per cent) of dye, M. P. 257°–259° C. dec.

*Example 20.—1-ethyl-1',8'-o-phenylene-2,4'-cyanine perchlorate*

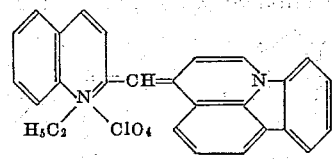

1,8-o-phenylenelepidinium perchlorate (1.06 g.), 2-iodoquinoline ethiodide (1.37 g.) and triethylamine (0.34 g.) were dissolved in 40 cc. of absolute ethyl alcohol and the reaction mixture was heated under reflux for twenty minutes. The reaction mixture was chilled overnight and the crude dye (1.20 g., 75 per cent) was filtered off, washed with water and acetone, and dried. Two recrystallizations from methyl alcohol yielded 0.45 g. (29 per cent) of dye, M. P. 295°–296° C. dec.

*Example 21.—3-ethyl-1',8'-o-phenyleneoxa-4'-carbocyanine iodide*

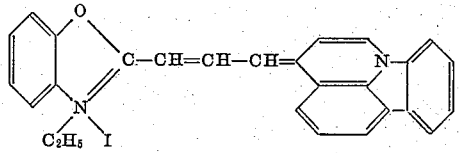

1,8-o-phenylenelepidinium iodide (1.00 g.), 2-β-acetanilidovinylbenzoxazole ethiodide and triethylamine were dissolved in 40 cc. of absolute ethyl alcohol and the reaction mixture was heated under reflux for twenty minutes. The reaction mixture was chilled overnight and the crude dye (0.85 g., 58 per cent) was filtered off, washed with alcohol, acetone and water, and dried. Two recrystallizations from methyl alcohol yielded 0.32 g. (22 per cent) of dye, M. P. 215°–217° C. dec.

*Example 22.—3-ethyl-1'-8'-o-phenylenethia-4'-carbocyanine iodide*

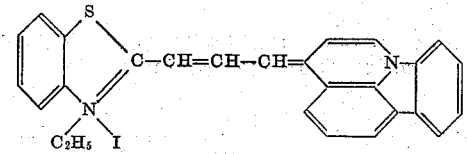

1,8-o-phenylenelepidinium iodide (1.00 g.), 2-β-acetanilidovinyl-benzothiazole ethiodide (1.36 g.) and triethylamine (0.31 g.) were dissolved in a 40 cc. of absolute ethyl alcohol, and the reaction mixture was heated under reflux for twenty minutes. The reaction mixture was chilled overnight and the crude dye (1.20 g., 77 per cent) was filtered off and washed with acetone, water and methyl alcohol, and dried. Two recrystallizations from methyl alcohol yielded 0.49 g. (33 per cent) of dye, M. P. 193°–195° C. dec.

*Example 23.—1,8,1',8'-di-(o-phenylene)-4,4'-carbocyanine iodide*

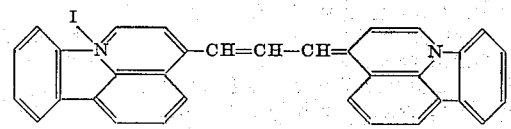

1,8-o-phenylenelepidinium iodide (1.95 g.) and diethoxymethyl acetate (2.0 g.) were dissolved in 25 cc. of dry pyridine and then heated under reflux for ten minutes. The reaction mixture was chilled and 0.75 g. (46 per cent) of crude dye filtered off, and well washed with water, acetone and methyl alcohol. Two recrystallizations from dry pyridine yielded 0.21 g. (13 per cent) of dye, M. P. 259°–260° C. dec.

*Example 24.—1',8'-[(1,2)-cyclopentylene]-3-ethylthia-4'-carbocyanine perchlorate*

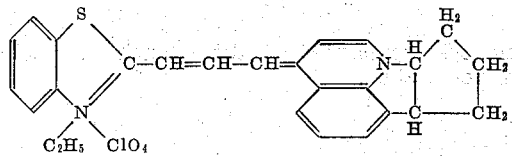

1,8-[(1,2)-cyclopentylene]lepidinium perchlorate (3.09 g.), 2-β-acetanilidovinylbenzothiazole ethiodide (4.50 g.) and triethylamine (1.01 g.) were dissolved in 50 cc. of absolute ethyl alcohol and the reaction mixture heated under reflux for fifteen minutes. The reaction mixture was chilled, the dye thrown out of solution with ether, and well washed with water and ether. Two recrystallizations from methyl alcohol yielded 2.05 g. (42 per cent) of dye, M. P. 215°–217° C. dec.

*Example 25.—1,8-[(1,2)-cyclopentylene]-4-p-dimethylaminostyrylquinolinium perchlorate*

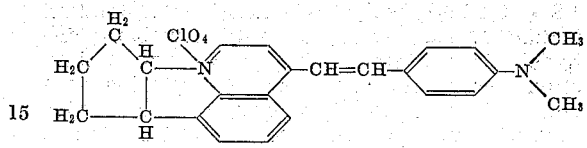

1,8-[(1,2)-cyclopentylene]lepidinium perchlorate (3.09 g.), p-dimethylaminobenzaldehyde (1.49 g.) and two drops of piperidine were dissolved in 25 cc. of absolute ethyl alcohol and heated under reflux for two hours. The reaction mixture was chilled and the crude dye thrown out with ether. Two recrystallizations from methyl alcohol yielded 0.70 g. (16 per cent) of dye, M. P. 215°–217° C. dec.

*Example 26.—1',8'-[(1,2)-cyclopentylene]-2,5-dimethyl-1-phenyl-3-pyrrolo-4'-carbocyanine perchlorate*

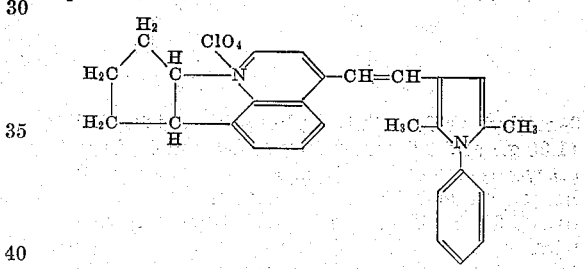

1,8-[(1,2)-cyclopentylene]lepidinium perchlorate (3.10 g.), 2,5-dimethyl-1-phenylpyrrole-3-aldehyde (1.99 g.) and five drops of piperidine were dissolved in 20 cc. of absolute ethyl alcohol and heated under reflux for two hours. The reaction mixture was chilled, the crude dye thrown out with ether and washed thoroughly with water and ether. The crude dye was stirred with a small amount of ethyl alcohol until crystalline and then filtered and recrystallized from methyl alcohol. The yield after two recrystallizations was 0.75 g. (16 per cent) of dye, M. P. 194°–196° C. dec.

*Example 27. — 3-ethyl-1',8'-(3,4,5,6-tetrahydro-o-phenylene)oxa-4'-carbocyanine perchlorate*

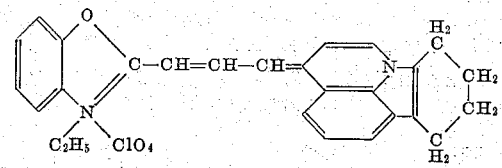

1,8-(3,4,5,6-tetrahydro-o-phenylene)lepidinium iodide (2.46 g.), 2-β-acetanilidovinylbenzoxazole ethiodide (2.90 g.) and triethylamine (0.68 g.) were dissolved in 35 cc. of absolute ethyl alcohol and then heated under reflux for fifteen minutes. The reaction mixture was chilled and the crude dye (1.53 g., 47 per cent) was thrown out of solution by the addition of aqueous sodium perchlorate. Three recrystallizations from methyl alcohol yielded 0.98 g. (30 per cent) of dye, M. P. 215°–217° C. dec.

*Example 28.—4 - p - dimethylaminostyryl - 1,8-(3,4,5,6 - tetrahydro-o-phenylene) quinolinium iodide*

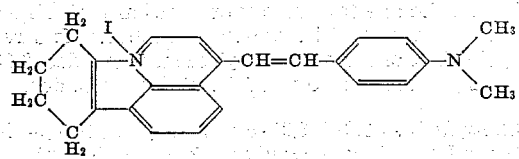

1,8 - (3,4,5,6-tetrahydro-o-phenylene)lepidinium iodide (1.84 g.) and p-dimethylaminobenzaldehyde (0.75 g.) were dissolved in 35 cc. of absolute ethyl alcohol and two drops of piperidine were added. The reaction mixture was heated under reflux for two hours, chilled, and the crude dye thrown out of solution with ether and repeatedly washed with water and ether. Two recrystallizations from methyl alcohol yielded 0.35 g. (22 per cent) of dye, M. P. 256°–257° C. dec.

*Example 29.—2',5'-dimethyl-1'-phenyl-3-pyrido - (k,l) - phenothiazino pyrrolocarbocyanine iodide*

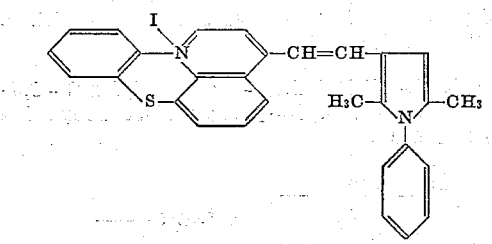

3-methylpyrido - (k,l) - phenothiazinium iodide (1.00 g.) and 2,5-dimethylpyrrol-3-aldehyde (0.60 g.) were dissolved in 25 cc. of acetic anhydride and heated under reflux for two minutes. The crude dye (1.05 g., 71 per cent) was filtered off, washed with water and ether, and acetone. Two recrystallizations from methyl alcohol yielded 0.36 g. (25 per cent) of dye, M. P. 249°–250° C. dec.

*Example 30. — 3-p-dimethylaminostyrylpyrido-(k,l) phenothiazinium iodide*

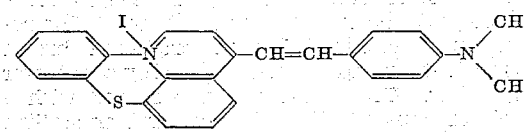

3 - methylpyrido - k,l - phenothiazinium iodide (1.00 g.) and p-dimethylaminobenzaldehyde (0.50 g.) were dissolved in 20 cc. of acetic anhydride and heated under reflux for two minutes. The reaction mixture was chilled and the crude dye (1.03 g., 77 per cent) was filtered off and washed with ether, water and acetone. Two recrystallizations from methyl alcohol yielded 0.75 g. (56 per cent) of dye, M. P. 229°–230° C. dec.

*Example 31.—3,3'-pyrido-(k,l)-phenothiazinocarbocyanine iodide*

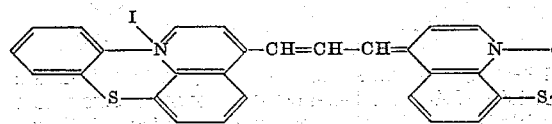

3-methylpyrido - [k,l] - phenothiazinium iodide (1.88 g.) and diethoxymethyl acetate (1.62 g.) were dissolved in dry pyridine and the reaction mixture heated under reflux for two minutes. The reaction mixture was filtered hot and the crude dye (1.30 g., 82 per cent) washed well with water, acetone and methyl alcohol. The crude, very insoluble dye was purified by extracting twice with 300 cc.-portions of boiling alcohol. The yield was 1.13 g. (71 per cent) of dye, M. P. 277°–278° C. dec.

*Example 32.—3-ethyloxa-[3'-pyrido-(k,l)-phenothiazino]carbocyanine iodide*

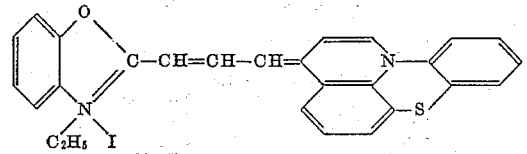

3-methylpyrido - [k,l] - phenothiazinium iodide (2.5 g.), 2-β-acetanilidovinylbenzoxazole ethiodide (2.9 g.) and triethylamine (0.70 g.) were dissolved in 40 cc. of absolute ethyl alcohol and the reaction mixture heated under reflux for ten minutes. The reaction mixture was chilled and filtered, and the crude dye (0.95 g., 28 per cent) was washed with water and ether, and dried. Two recrystallizations from methyl alcohol yielded 0.65 g. (19 per cent) of dye, M. P. 239°–241° C. dec.

*Example 33.—3-ethylthia-(3'-pyrido-(k,l)-phenothiazino) carbocyanine iodide*

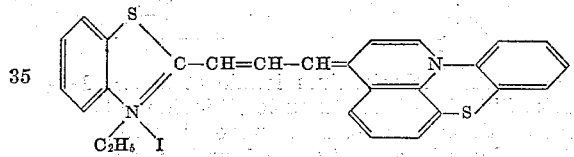

3-methylpyrido - (k,l) - phenothiazinium iodide (1.26 g.), 2-β-acetanilidovinylbenzothiazole ethiodide (1.50 g.) and triethylamine (0.34 g.) were dissolved in 40 cc. of absolute ethyl alcohol and the reaction mixture heated under reflux for fifteen minutes. The reaction mixture was chilled overnight. The crude dye (0.75 g., 39 per cent) was filtered, washed with water and ether, and dried. Two recrystallizations from methyl alcohol yielded 0.35 g. (19 per cent) of dye, M. P. 211°–212° C. dec.

In a manner similar to that illustrated in the foregoing examples, other dyes containing a complex or fused quinoline nucleus containing a bridge of atoms from the one to the eight positions can be prepared. Thus, by replacing the 1,8-trimethylenequinaldinium iodide of Example 7 by a molecularly equivalent amount of 1,8-o-phenylenequinaldinium iodide, a merocarbocyanine dye represented by the following formula can be obtained.

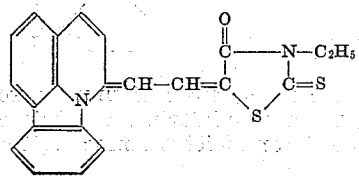

In like manner by replacing the 5-acetanilido-methylene-3-ethylrhodanine of Example 7 by a molecularly equivalent amount of 5-acetanilido-methylene-1,3-diethyl-2-thiobarbituric acid, a merocarbocyanine dye represented by the following formula can be obtained:

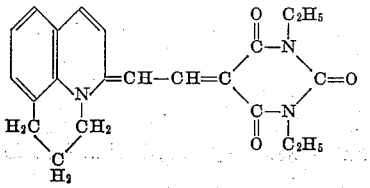

By replacing the 1,8-[(1,2)-cyclopentylene]lepidinium perchlorate of Example 26 by a molecularly equivalent amount of 1,8-ethylenequinaldinium iodide, a pyrrolocarbocyanine dye represented by the following formula can be obtained:

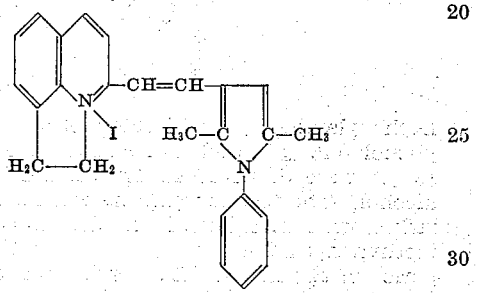

Operating in a similar manner, other polymethine dyes can advantageously be prepared according to the embodiments described herein.

The intermediates represented by Formulas XIII and XIV above can advantageously be prepared according to the methods described in the copending applications Serial No. 154,881 of Donald W. Heseltine and Serial No. 154,882 of Donald W. Heseltine and Leslie G. S. Brooker, both filed herewith, now U. S. Patents 2,578,303 and 2,578,304, respectively, both issued December 11, 1951. The following examples are exemplary of the methods described in those applications:

*Example 34.—1,8-trimethylenequinaldinium iodide*

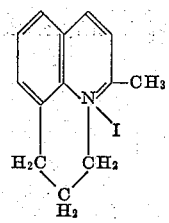

60 g. of tetrahydroquinoline hydrochloride (MW=170) and 115 g. of ferric chloride (MW=162) were dissolved in 400 cc. of absolute ethyl alcohol, and 5 g. of anhydrous zinc chloride were added. The mixture was heated to reflux temperature in a one-liter, 3-neck flask fitted with a stirrer, reflux condenser and a dropping funnel. There were then added 90 g. of paraldehyde (MW=132) in small portions to the reaction mixture over a period of one hour. The stirring and heating were continued for 15 hours.

The alcohol was removed from the reaction mixture by distillation, and the salts taken up in three liters of hot water. The aqueous solution was made slightly alkaline with 40 per cent sodium hydroxide, and precipitated hydroxides were filtered off. The filtrate was treated with 20. g. of sodium iodide (MW=150) and taken to dryness under reduced pressure. The combined salts were extracted with 500 cc. of ethyl alcohol, and the alcoholic solution concentrated at 100 cc. and chilled. The 1,8-trimethylenequinaldinium iodide was filtered off and recrystallized from ethyl alcohol. There were thus obtained 22 g. of pure salt, representing a 20 per cent yield.

When a molecularly equivalent amuont of the hydrochloride of carbazole is substituted for the tetrahydroquinoline hydrochloride used in the above example, a quaternary salt represented by the following formula can be obtained:

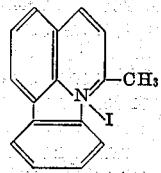

Also, it is possible to use to advantage aldol in place of the paraldehyde.

*Example 35.—1-methylquinaldinium perchlorate*

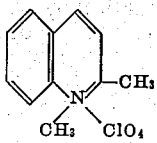

53 g. of N-methyl aniline (MW=107) were dissolved in 200 cc. of concentrated hydrochloric acid, and 35 g. of o-nitrophenol were added. The reaction mixture was heated to reflux with stirring and 132 g. of paraldehyde (MW=132) were added dropwise over a two-hour period. The aqueous portion was decanted from the tar, and the tar washed with an additional 200 cc. of hot water. The combined aqueous extracts were chilled, filtered, and washed with benzene. The water portion was mixed with decolorizing carbon, shaken, filtered, and evaporated to dryness under reduced pressure. The residue was extracted with 100 cc. of water, neutralized with an aqueous solution of sodium carbonate, and extracted with chloroform. The aqueous portion was mixed with decolorizing carbon, shaken, and filtered. The quaternary salt was then precipitated by the addition of 20 g. of sodium perchlorate, filtered off and dried. After recrystallization from ethyl alcohol, 10.1 g. of 1-methylquinaldinium perchlorate, representing an 8 per cent yield, were obtained. It melted at 154°–156° C.

When a molecularly equivalent amount of N-methyl-p-chloroaniline replaces the N-methyl aniline in the above example, a quaternary salt represented by the following formula can be obtained:

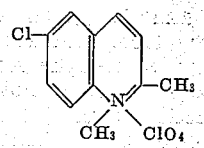

*Example 36.—1,8-ethylenequinaldinium iodide*

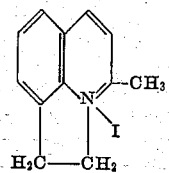

60 g. of indoline (MW=119) were dissolved in 200 cc. of concentrated hydrochloric acid, and 51 g. of m-nitrobenzenesulfonic acid (MW=203) were added. The reaction mixture was brought to reflux and 132 g. of paraldehyde (MW=132) added dropwise with stirring over a period of two hours. The heating was then continued for twelve hours. The aqueous portion was decanted and then extracted with two liters of boiling water. The combined aqueous portions were neutralized with aqueous sodium carbonate, extracted with benzene, mixed with decolorizing carbon, and filtered. 30 g. of sodium iodide (NM=150) were added and the aqueous solution evaporated to dryness under reduced pressure. The combined salts were extracted with 500 cc. of hot absolute ethyl alcohol. The alcohol extracts were concentrated to 150 cc., mixed with decolorizing carbon, shaken, filtered, and chilled. The filter cake was then dried to give 30 g. of 1,8-ethylenequinaldinium iodide, representing a 20.1 per cent yield. It melted at 254°–255° C. with decomposition.

When a molecularly equivalent amount of 2,3-trimethyleneindoline replaces the indoline in the above example, a quaternary salt represented by the following formula can be obtained:

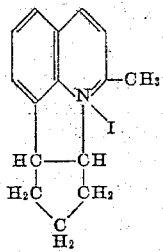

*Example 37.*—*1-phenylquinaldinium perchlorate*

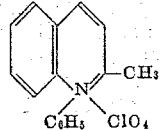

84.5 g. of diphenylamine (MW=169) were dissolved in 400 cc. of nitrobenzene, and 49 g. of sulfuric acid were added dropwise with stirring. While the stirring was continued, 53 g. of crotonaldehyde were added dropwise over a period of an hour to the refluxing reaction mixture. The refluxing was continued for two additional hours. The nitrobenzene was removed by steam distillation and the tar extracted with two liters of boiling water. The aqueous portion was neutralized with sodium carbonate, extracted with benzene, and 30 g. of sodium iodide (MW=150) were added. The water solution was evaporated to dryness, and the product extracted from the salts with 400 cc. of hot absolute ethyl alcohol. The alcohol solution was concentrated to 75 cc. and chilled. The 1-phenylquinaldinium salt was thrown out of solution by the addition of ether. The precipitated salt was then dissolved in 20 cc. of water and precipitated by the addition of 5 g. of sodium perchlorate. The product was filtered off, and after recrystallization from water gave 7.5 g. of 1-phenylquinaldinium perchlorate. It melted at 160°–162° C. with decomposition.

When a molecularly equivalent amount of phenothiazine replaces the diphenylamine in the above example, a quaternary salt represented by the following formula can be obtained:

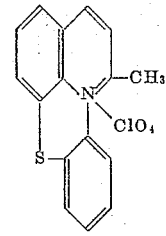

*Example 38.*—*1-phenyllepidinium iodide*

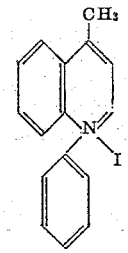

Diphenylamine hydrochloride (102.5 g.), o-nitrophenol (46 g.) and anhydrous zinc chloride (5 g.) were dissolved in 400 cc. absolute ethyl alcohol. The reaction mixture was heated under reflux with mechanical stirring and 50 g. of methylvinyl ketone were added dropwise over a period of two hours. The heating was continued overnight and then the alcohol was removed, and the residue extracted with two liters of boiling water. The aqueous portion was then made just alkaline with alkali, treated with decolorizing carbon and filtered. The filtrate was acidified with hydrochloric acid, 50 g. of sodium iodide added and the solution evaporated to dryness under reduced pressure. The dry salts were then extracted with two 300 cc. portions of absolute ethyl alcohol and the alcohol extracts concentrated to 100 cc. and chilled overnight. The quaternary salt was filtered off and recrystallized from 150 cc. of water yielding 30.5 g. (17%) of amber colored crystals with a M. P. of 233°–235° C. with decomposition.

*Anal.*—Calcd. for $C_{16}H_{14}IN$: I, 36.6. Found: I, 36.4.

*Example 39.*—*1,8-trimethylenelepidinium iodide*

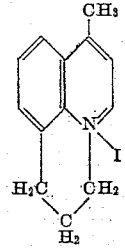

Tetrahydroquinoline hydrochloride (60 g.), ferric chloride (anhydrous) (115 g.) and anhydrous zinc chloride (5 g.) were dissolved in 300 cc. of absolute ethyl alcohol. The reaction mixture was heated under reflux with mechanical stirring and 38 g. of methylvinyl ketone were added dropwise over a period of two hours. The reaction mixture was refluxed overnight and the alcohol distilled off. The residue was extracted with three liters of boiling water and the water solution made just alkaline with 40% sodium hydroxide. Filter-cel (100 g.) was added, the solution filtered, and the filtrate acidified with hydrochloric acid. Then 50 g. of sodium iodide were added and the aqueous solution was taken to dryness under reduced pressure. The mixture of salts was extracted with 500 cc. of boiling absolute ethyl alcohol, the alcohol solution concentrated to 150 cc., and chilled overnight. The quaternary salt was filtered off, dissolved in a minimum amount of boiling water, treated with 2 g. of decolorizing carbon, filtered and chilled. The product was filtered off and dried, yielding 22 g. (19.4%) of yellow crystals having a M. P. of 186°–187° C. with decomposition.

*Anal.*—Calcd. for $C_{13}H_{14}IN$: I, 40.8. Found; I, 41.0.

*Example 40.—1,8-ethylenelepidinium iodide,*

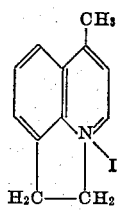

Indoline (60 g.) was dissolved in 180 cc. of 10% hydrogen chloride in absolute ethyl alcohol and added to 162 g. of ferric chloride in 300 cc. of ethyl alcohol. Anhydrous zinc chloride (10 g.) was then added and the reaction mixture heated under reflux with mechanical stirring. Methylvinyl ketone (85%, 50 g.) was then added dropwise over a period of two hours. The reaction mixture was heated overnight and then the alcohol distilled off on the steam bath. The residue was extracted with three liters of boiling water, the aqueous solution filtered, treated with decolorizing carbon and made just alkaline with 40% sodium hydroxide. Filter-cel (100 g.) was stirred in, the solution filtered, made just acid with hydrochloric acid and 50 g. of sodium iodide added. The aqueous solution was then evaporated to dryness under reduced pressure and the combined salts were extracted with two 300 cc. portions of absolute ethyl alcohol. The alcoholic extracts were concentrated to 150 cc. and chilled overnight. The crystalline quaternary salt was filtered off and recrystallized from 100 cc. of water yielding 23.8 g. (17%) of yellowish crystals having a M. P. of 192–194° C. with decomposition.

*Anal.*—Calcd. for $C_{12}H_{12}IN$: I, 42.7. Found: I, 42.6.

*Example 41.—1,8-o-phenylenelepidinium iodide*

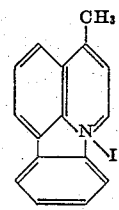

Carbazole (84 g.) was suspended in 400 cc. of absolute ethyl alcohol and 49 g. of sulfuric acid was added dropwise with stirring. Then 23 g. of o-nitrophenol and 10 g. of anhydrous zinc chloride were added and the reaction mixture heated to reflux temperature. Methylvinyl ketone (50 g.) was then added dropwise over a period of two hours and the heating continued overnight. The alcohol was removed by distillation, the residue extracted with four liters of boiling water, and the aqueous extract neutralized with sodium carbonate. The water solution was treated with decolorizing carbon, filtered, acidified with hydrochloric acid, 20 g. of sodium iodide added, and then evaporated to dryness under reduced pressure. The dry mixed salts were extracted with 500 cc. of absolute alcohol. The alcoholic solution was concentrated to 75 cc. and the quaternary salt thrown out of solution by the addition of ether. The ether-alcohol solution was decanted and the sticky residue stirred with acetone until crystalline. The quaternary salt was filtered off and recrystallized from ethyl alcohol yielding 6.2 g. (3.6%) of yellowish powder.

*Example 42.—1,8-(3,4,5,6-tetrahydro-o-phenylene) lepidinium iodide*

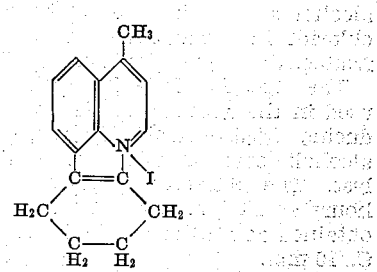

3,4,5,6-tetrahydrocarbazole (85.6 g.) was dissolved in 500 cc. of nitrobenzene in a two-liter, three-necked flask fitted with a condenser and a mechanical stirrer. Concentrated sulfuric acid (49 g.) was added dropwise, the reaction mixture was heated to the reflux temperature and 70 g. of methylvinyl ketone were added dropwise over a period of one hour. The heating and stirring were continued overnight and then the nitrobenzene was removed by steam distillation. The aqueous solution was decanted from the tar, neutralized with sodium carbonate, extracted with benzene, and finally, acidified with hydrochloric acid. The aqueous portion was then evaporated to dryness under reduced pressure and the mixed salts remaining were extracted with 500 cc. of absolute ethyl alcohol. The alcoholic solution was concentrated to 100 ml., chilled, and filtered. The crude quaternary salt was dissolved in 100 cc. of hot water and precipittaed by the addition of 10 g. of sodium iodide yielding 9.5 g. (5%) of brown powder. Recrystallization from water gave yellow cubes, M. P. 268°–270° C. with decomposition.

*Example 43.—1,8-o-cyclopentylenelepidinium perchlorate*

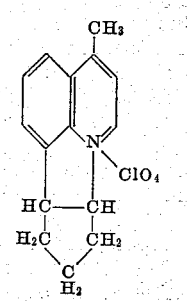

1,2,3,4,3a,8b-hexahydrocyclopentindole (32 g.), o-nitrophenol (14 g.) and zinc chloride (2 g.) were dissolved in 200 cc. of absolute ethyl alcohol in a one-liter, three-necked flask fitted with a condenser and a mechanical stirrer. Sulfuric acid (20 g.) was added dropwise with stirring, and the reaction mixture was heated to reflux. Then freshly distilled methyl vinyl ketone (20 g.) was added dropwise over a period of one hour. The reaction mixture was heated with stirring for an additional two hours and then as much alcohol as possible was removed by distillation. The residue was extracted with one liter of boiling water and the aqueous portion neutralized with sodium carbonate and extracted with benzene. The aqueous extract was then acidified with hydrochloric acid and concentrated to 100 cc. The crude quaternary salt was precipitated by one addition of sodium perchlorate (20 g. in 40 cc. of water), the solution chilled and the water decanted leaving 25 g. (41%) of crude product as a heavy yellow oil. The salt, after repeated washing with water, ether and ethyl alcohol and drying for 48 hours over calcium chloride in a vacuum dessicator, was a yellow, friable, very hygroscopic solid.

The 1,2,3,4,3a,8b - hexahydrocyclopentindole used in the above example was prepared by reducing 1,2,3,4-tetrahydrocyclopentindole in an alcoholic solution using Raney nickel as a catalyst. The solution was heated at 100° C. for 24 hours at 1500 p. s. i. The desired product was obtained as a colorless liquid boiling at 98°–100° C./10 mm.

*Example 44.—3 - methylpyrido-(k,l)-phenothiazinium iodide*

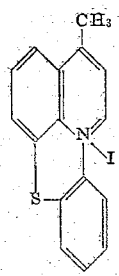

Phenothiazine (199 g.) was suspended in one liter of absolute ethyl alcohol and o-nitrophenol (46 g.) and anhydrous zinc chloride (5 g.) were added. Concentrated sulfuric acid (98 g.) was added dropwise with stirring. The reaction mixture was then heated to boiling in a five-liter, three-necked flask fitted with a condenser and a mechanical stirrer and methyl vinyl ketone (freshly distilled) (80 g.) was added dropwise over a period of two hours. The reaction mixture was heated under reflux overnight and then as much alcohol as possible removed by distillation. The residue was stirred with several portions of ether and the ether decanted. The remaining oil was stirred with three liters of acetone to remove the excess phenothiazine. The acetone was decanted and the residue extracted with one liter of boiling water. The aqueous extract was treated with decolorizing carbon, filtered and sodium iodide (20 g.) added and the solution chilled. The product was filtered off, washed with acetone and recrystallized from methyl alcohol and then from water, yielding 7.3 g. (2%) of amber crystals melting at 287–288° C. with decomposition.

The cyclammonium quaternary salts represented by Formula XII above can advantageously be prepared by the quarternization of the corresponding 2-thioquinolone compounds. The following equations illustrate schematically the method of preparing representative intermediates represented by the compounds of Formula XII.

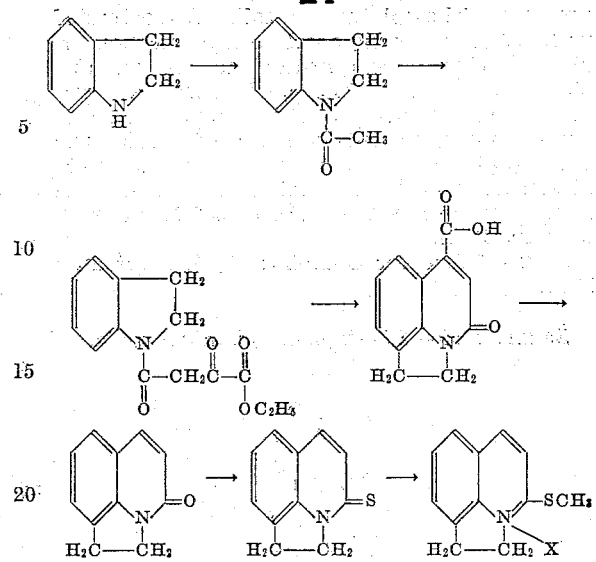

The following examples illustrate the application of the above series of steps as applied to tetrahydroquinoline and indoline.

*Example 45.—1-acetyltetrahydroquinoline*

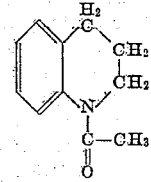

Acetic anhydride (350 g.) was added slowly with shaking and cooling to tetrahydroquinoline (450 g.). After the addition was complete, the acetic acid was distilled off at atmospheric pressure and the residue vacuum distilled, yielding 535 g. (90 per cent) of the desired compound boiling at 164°–166° C. at 14 mm.

*Example 46.—1-ethoxalylacetyltetrahydroquinoline*

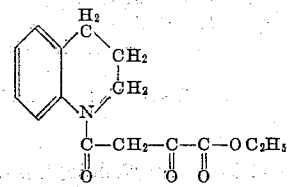

Ethyl alcohol (29 cc.) and dry xylene (225 cc.) were heated to reflux temperature in a one-liter, three-necked flask fitted with a condenser and a mechanical stirrer. Sodium (11.5 g.) was added gradually with stirring, and after the sodium ethoxide was formed, the reaction mixture was cooled to room temperature and 87.5 g. of 1-acetyltetrahydroquinoline and 200 g. of xylene were added. Then 73 g. of ethyl oxalate were added slowly over a period of an hour and stirring was continued overnight. Concentrated sulfuric acid (25 g.) was dissolved in dry ether and added slowly to the reaction mixture and stirred for an hour. The reaction mixture was then shaken with 200 g. of water, separated, and the ether and xylene removed under reduced pressure. The residual oil was chilled and stirred until crystalline, then filtered and washed with 20 per cent ethyl alcohol and dried, yielding 72 g. (52 per cent) of cream-colored crystals with M. P. 99°–101° C.

Example 47.—4-carbethoxy-1,8-trimethylene-2-quinolone

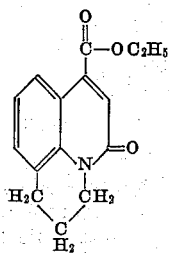

Ethoxalylacetyltetrahydroquinoline (27.5 g.) was added portionwise to 110 g. of concentrated sulfuric acid previously cooled to −15° C. in a Dry Ice-acetone bath. The reaction mixture was mechanically stirred and the rate of addition controlled to maintain the temperature between −10° C. and −15° C. After the addition was complete, the Dry Ice bath was removed and the reaction mixture allowed to come to room temperature. The reaction mixture was then poured with stirring into 400 g. of ice and water. The product was filtered, washed with water and dried, yielding 24 g. (93.5 per cent) of white powder with M. P. 147°–148° C.

Example 48.—4-carboxy-1,8-trimethylene-2-quinolone

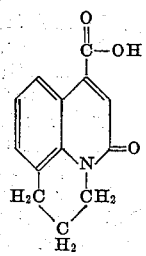

4 - carbethoxy-1,8-trimethylene-2-quinolone (24 g.) was suspended in a solution of 4.5 g. of sodium hydroxide in 120 cc. of water. The reaction mixture was heated under reflux for one-half-hour, filtered, and the filtrate acidified with concentrated hydrochloric acid. The reaction mixture was chilled, filtered, the product well washed with water, and dried. The yield was 21.0 g. (98 per cent) of white powder melting at 230°–231° C.

Example 49.—1,8-trimethylene-2-quinolone

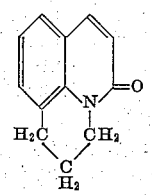

4 - carboxy-1,8-trimethylene-2-quinoline (26 g.) and 10 g. of copper powder were suspended in 70 ml. of isoquinoline and the reaction mixture heated under reflux for one-half hour, by which time the evolution of carbon dioxide had ceased. The reaction mixture was filtered, and 150 cc. of concentrated hydrochloric acid added and the product extracted with chloroform. The chloroform was removed and the product vacuum distilled yielding 19 g. (90 per cent) of colorless crystals with M. P. 102°–103° C., and B. P. 140°–145° C./1 mm.

Example 50.—1,8-trimethylene-2-thioquinolone

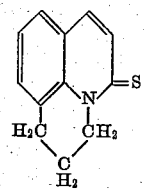

1,8-trimethylene-2-quinolone (64 g.) was dissolved in pyridine (300 cc.) and phosphorous pentasulfide (39 g.) was added portionwise with shaking. The reaction mixture was refluxed with frequent shaking for a period of fifteen minutes and then poured into a liter of cold water with stirring and allowed to stand overnight. The product was filtered off and recrystallized from methyl alcohol, yielding 62.5 g. (90 per cent) of the desired product, M. P. 152°–153° C.

Example 51.—2-methylmercapto-1,8-trimethylenequinolinium iodide

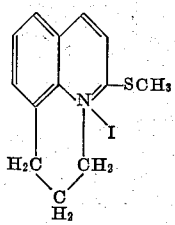

1,8-trimethylene-2-thioquinolone (10 g.) and methyl p-toluenesulfonate were mixed and heated overnight on the oil bath at 110° C. The reaction mixture was cooled, dissolved in methyl alcohol and precipitated with ether yielding 14.3 g. (100 per cent). A portion of the product (3.81 g.) was dissolved in water and precipitated as the iodide by the addition of aqueous sodium iodide yielding 3.1 g. (90 per cent) of 2-methylmercapto-1,8-trimethylenequinolinium iodide as almost colorless needles, M. P. 219–221° C.

Example 52.—1-acetylindoline

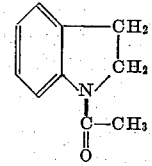

Acetic anhydride (88 g.) was added slowly and with stirring to indoline (100 g.). After the addition was complete, the acetic acid was removed by distillation at atmospheric pressure, and the residue was vacuum distilled yielding 122 g. (91 per cent) of the desired product, boiling at 125°–130° C. at 1 mm., and M. P. 102°–103° C.

Example 53.—1-ethoxalylacetylindoline

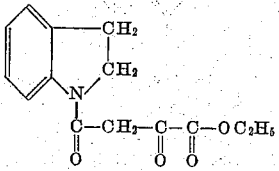

Ethyl alcohol (39 g.) was dissolved in xylene (400 cc.) in a three-liter, three-necked flask fitted with a mechanical stirrer and condenser. The flask was heated to reflux and sodium (19.4 g.) was added portionwise, the heating and stirring being continued until all the sodium reacted. The reaction mixture was then cooled to room temperature and ethyl oxalate (123 g.) in xylene (400 cc.) was added. Then acetylindoline (110 g.) in xylene (200 cc.) was added dropwise with stirring and the stirring continued overnight. Sulfuric acid (41 g.) in ether (200 cc.) was added and stirred for one hour. The reaction mixture was then shaken with water (500 cc.) to remove the sodium sulfate, the aqueous layer separated, and the xylene and ether removed by distillation under reduced pressure. The residual oil was chilled and stirred until crystalline, filtered, and washed with 20 per cent ethyl alcohol, yielding 160 g. of yellow powder, M. P. 134°–140° C.

*Example 54.—4-carboxy-1,8-ethylene-2-quinolone*

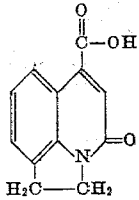

Ethoxalylacetylindoline (52.5 g.) was dissolved in a solution of 36 g. of phosphorous pentoxide in 400 g. of 85 per cent phosphoric acid. The reaction mixture was heated for two hours at 115°–120° C. and then poured into four liters of ice and water and allowed to stand overnight. After filtering, washing with water and drying, the reaction mixture yielded 36 g. (83 per cent) of white powder melting above 320° C.

*Example 55.—1,8-ethylene-2-quinolone*

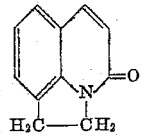

4-carboxy-1,8-ethylene-2-quinolone (70 g.), copper powder (10 g.) and isoquinoline (200 cc.) were mixed and heated under reflux for two hours. The reaction mixture was cooled, filtered and the copper powder washed with chloroform. The isoquinoline solution was treated with an excess of 6 N hydrochloric acid and the quinolone extracted with chloroform. The chloroform solution was dried, the solvent distilled off and the residue vacuum distilled yielding 35 g. (63 per cent) of product, B. P. 190°–200° C./1 mm., and M. P. 157°–158° C.

*Example 56.—1,8-ethylene-2-thioquinolone*

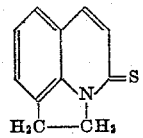

1,8-ethylene-2-quinolone (35 g.) was dissolved in pyridine (100 cc.) and the phosphorous pentasulfide (25 g.) was added portionwise with stirring. The reaction mixture was heated under reflux for fifteen minutes, poured with stirring into 600 cc. of water and allowed to stand overnight. The product was filtered off, dried and recrystallized from benzene yielding 32 g. (84 per cent) of straw-yellow plates, M. P. 177°–178° C.

*Example 57.—2-methylmercapto-1,8-ethylenequinolinium p-toluenesulfonate*

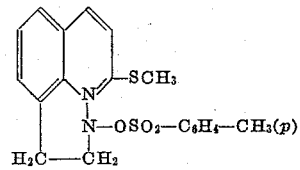

This compound was prepared as needed by fusion of 1,8-ethylene-2-thioquinolone with methyl p-toluenesulfonate. A sample of the quaternary salt crystallized from water in almost colorless plates melted at 187°–188° C.

While our invention is primarily directed to the preparation of polymethine dyes containing a complex or fused quinoline nucleus, we have further found that the intermediates described in Examples 37 and 38 above can also be used in the preparation of useful polymethine dyes. The following examples illustrate the preparation of certain of the dyes obtainable from the intermediates of these examples.

*Example 58.—4-p-dimethylaminostyryl-1-phenylquinolinium iodide*

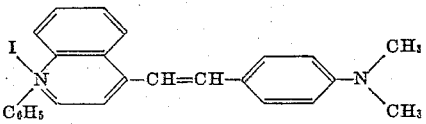

1-phenyllepidinium iodide (1.73 g.) and p-dimethylaminobenzaldehyde (0.75 g.) were dissolved in 30 cc. of absolute ethyl alcohol and two drops of piperidine were added. The reaction mixture was heated under reflux for four hours, chilled overnight and the crude dye (1.05 g., 44 per cent) was filtered off, washed with water and ether, and dried. After two recrystallizations from methyl alcohol, the yield was 0.60 g. (25 per cent) of product, M. P. 263°–265° C. dec.

*Example 59.—1-ethyl-1'-phenyl-2,4'-cyanine iodide*

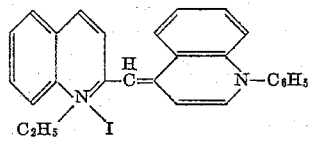

1-phenyllepidinium iodide (1.73 g.) and 2-iodoquinoline ethiodide (2.1 g.) was dissolved in 30 cc. of ethyl alcohol and triethylamine (0.51 g.) was added. The reaction mixture was heated under reflux for one hour, chilled overnight and the crude dye (2.25 g., 90 per cent) was filtered off, washed well with water and dried. After two recrystallizations from methyl alcohol, the yield of pure dye, M. P. 251°–253° C. dec., was 1.50 g. (60 per cent).

*Example 60.—3-ethyl-1'-phenyloxa-4'-carbocyanine iodide*

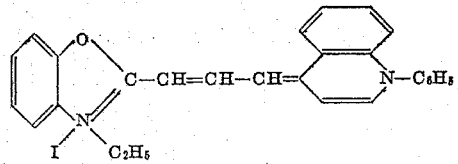

1-phenyllepidinium iodide (1.73 g.) and 2-β-acetanilidovinylbenzoxazole ethiodide (2.2 g.) were dissolved in 40 cc. of absolute ethyl alcohol, and triethylamine (0.51 g.) was added. The reaction mixture was heated under reflux for fifteen minutes, chilled overnight and the crude dye (2.25 g., 87 per cent) was filtered off, washed with water and dried. The yield was 1.65 g. (64 per cent) after two recrystallizations from methyl alcohol, M. P. 269°–270° C. dec.

*Example 61.—3-ethyl-1'-phenylthia-4'-carbocyanine iodide*

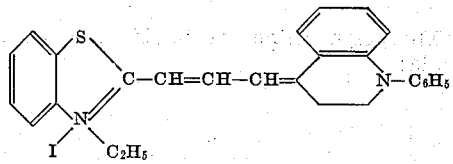

1-phenyllepidinium iodide (1.73 g.) and 2-β-acetanilidovinylbenzothiazole ethiodide (2.25 g.) were dissolved in 50 cc. of ethyl alcohol and triethylamine (0.51 g.) was added. The reaction mixture was heated under reflux for fifteen minutes, chilled overnight and the crude dye was filtered off, washed with water and acetone, and dried. The crude dye (2.50 g., 93 per cent) was twice recrystallized from methyl alcohol to yield 1.70 g. (63 per cent) of pure dye, M. P. 302°–303° C. dec.

*Example 62.—1,1'-diphenyl-4,4'-carbocyanine iodide*

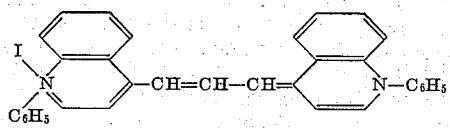

1-phenyllepidinium iodide (3.47 g.) was dissolved in 30 cc. of pyridine and diethoxymethyl acetate (1.62 g.) was added, and the reaction mixture was refluxed for twenty minutes. After chilling overnight, the crude dye (2.30 g., 82 per cent) was filtered off, washed with water and acetone, and dried. Two recrystallizations from methyl alcohol yielded 1.25 g. (44 per cent) of dye, M. P. 314°–315° C. dec.

The polymethine dyes of our invention selected from those represented by Formulas II to XI above which have been found to be the most useful in our invention comprise those dyes having a fused quinoline nucleus selected from those represented by the following general formulas:

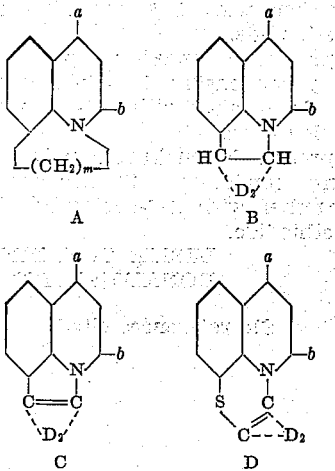

wherein $m$ represents a positive integer from 2 to 3, $D_2$ represents the non-metallic atoms necessary to complete a carbocyclic nucleus containing from 5 to 6 atoms in the ring, and $a$ and $b$ illustrate the point of attachment of the fused quinoline nucleus to the intercyclic chain, i. e. the nucleus can be attached either in the α- or γ-position. From Formulas A, B, C, and D above, it can be seen that the values given for Z above include not only simple pyrrole, pyridine, and thiazine nuclei, but also fused derivatives thereof, as well as hydrogenated derivatives thereof. The nuclei can have substituted thereon such groups as chlorine, iodine, alkoxyl (e. g. methoxyl, ethoxyl, etc.) hydroxyl, etc.

Our new dyes sensitize photographic emulsions in a useful manner. Our invention is particularly directed to the customarily employed silver halide especially the silver chloride and bromide emulsions, which may contain other salts which may be light sensitive. Our invention is further particularly directed to the customarily employed gelatin emulsions. However, the gelatin can be replaced with any other carrier which has substantially no deleterious effect on the light-sensitive materials, e. g. with a cellulose derivative or a resin.

In the preparation of photographic emulsions sensitized with our new dyes, it is only necessary to thoroughly disperse a small amount of our dyes in an ordinary photographic emulsion. The suitable and most economical concentration for any given emulsion will be apparent to those skilled in the art upon making the ordinary tests and observations customarily used in the art of emulsion making. To prepare a gelatino-silver-halide emulsion the following procedure is satisfactory: A quantity of the dye is dissolved in a suitable solvent, for example methyl alcohol or acetone, advantageously the former, and a volume of this solution (which may be diluted with water) containing from 5 to 100 mg. of dye is slowly added to about 1000 cc. of an ordinary flowable gelatino-silver-halide emulsion with stirring. The dye is thoroughly incorporated. With the more powerful of our new sensitizing dyes, 10 to 20 mg. of dye per 1000 cc. of emulsion will suffice to produce maximum sensitizing effects with the ordinary gelatino-silver-halide emulsion.

The above statements are only illustrative and are not to be understood as limiting our invention in any sense as it will be apparent that these dyes can be incorporated by other methods in many of the photographic emulsions customarily employed in the art, such, for instance as by bathing a plate or film, upon which an emulsion has been coated, in a solution of the dye in an appropriate solvent, although such a method is ordinarily not to be preferred. The claims are intended to cover any combination of our new dyes with a photographic emulsion whereby the dyes exert a sensitizing effect upon the emulsion as well as a photographic element comprising a support, ordinarily transparent, upon which the light-sensitive emulsion is coated or spread and permitted to set or dry.

What we claim as our invention and desire secured by Letters Patent of the United States is:

1. A polymethine dye selected from the group consisting of those represented by the following four general formulas:

I.

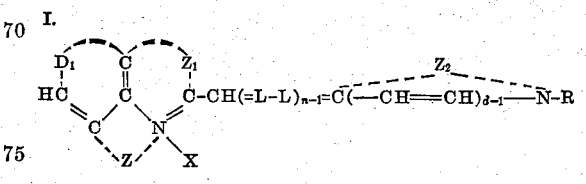

II.

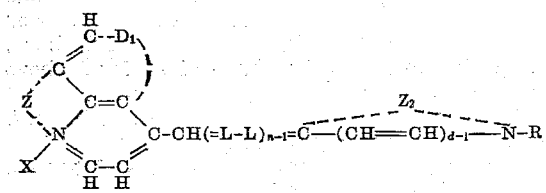

III.

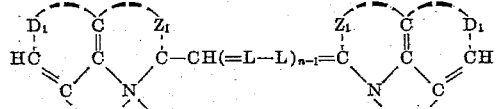

IV.

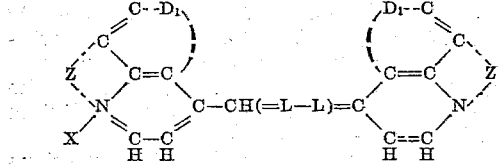

wherein R represents an alkyl group, Z represents the non-metallic atoms necessary to complete a heterocyclic nucleus selected from the group consisting of those of the pyrrole series, those of the pyridine series, and those of the thiazine series, $Z_1$ represents the non-metallic atoms necessary to complete a heterocyclic nucleus of the pyridine series, $Z_2$ represents the non-metallic atoms necessary to complete a heterocyclic nucleus selected from the group consisting of those of the thiazole series, those of the benzothiazole series, those of the naphthothiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 4-quinoline series, those of the 1-isoquinoline series, those of the 3-isoquinoline series, and those of the 3,3-dialkylindolenine series, $D_1$ represents the non-metallic atoms necessary to complete a mononuclear aryl group of the benzene series, L represents a methine group, $n$ and $d$ each represents a positive integer of from 1 to 2, and X represents an acid radical.

2. The polymethine dye having the following formula:

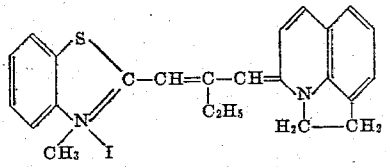

3. The polymethine dye having the following formula:

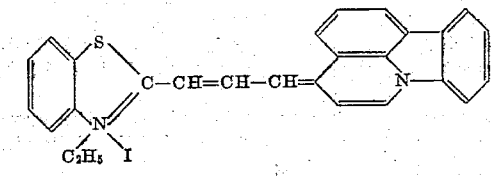

4. The polymethine dye having the following formula:

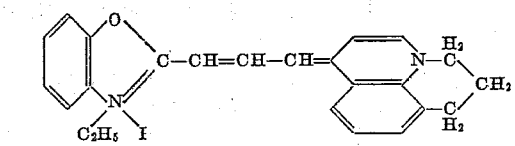

5. The polymethine dye having the following formula:

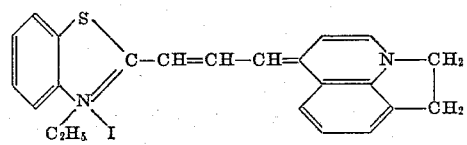

6. The polymethine dye having the following formula:

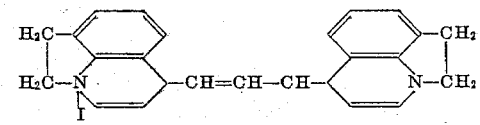

7. A process for making a polymethine dye comprising condensing a cyclammonium quaternary salt containing a methyl group in a position selected from the group consisting of α- and γ-positions, said cyclammonium quaternary salt containing a fused quinoline nucleus having a bridge of atoms from the one to the eight positions, said bridge of atoms completing a heterocyclic nucleus containing from 5 to 6 atoms in the ring selected from the group consisting of those of the pyrrole series, the pyridine series, and the thiazine series, with a cyclammonium quaternary salt containing from 5 to 6 atoms in the heterocyclic ring and containing in a position selected from the group consisting of α- and γ-positions a reactive group selected from the group consisting of a β-arylaminovinyl group, a β-alkylmercaptovinyl group, a β-arylmercaptovinyl group, an alkylmercapto group, an arylmercapto group, and a halogen atom.

8. A process for making a polymethine dye comprising condensing 1,8-ethylenequinaldinium iodide together with 2-(2-methylmercaptobutenyl)benzothiazole methiodide.

9. A process for making a polymethine dye comprising condensing 1,8-o-phenylenepidinium iodide together with 2-β-acetanilidovinylbenzothiazole ethiodide.

10. A process for making a polymethine dye comprising condensing 1,8 - trimethylenelepidinium iodide together with 2-β-acetanilidovinylbenzoxazole ethide.

11. A process for making a polymethine dye comprising condensing 1,8-ethylenelepidinium iodide together with 2-β-acetanilidovinylbenzothiazole ethiodide.

LESLIE G. S. BROOKER.
DONALD W. HESELTINE.

No references cited.